Figure 1:
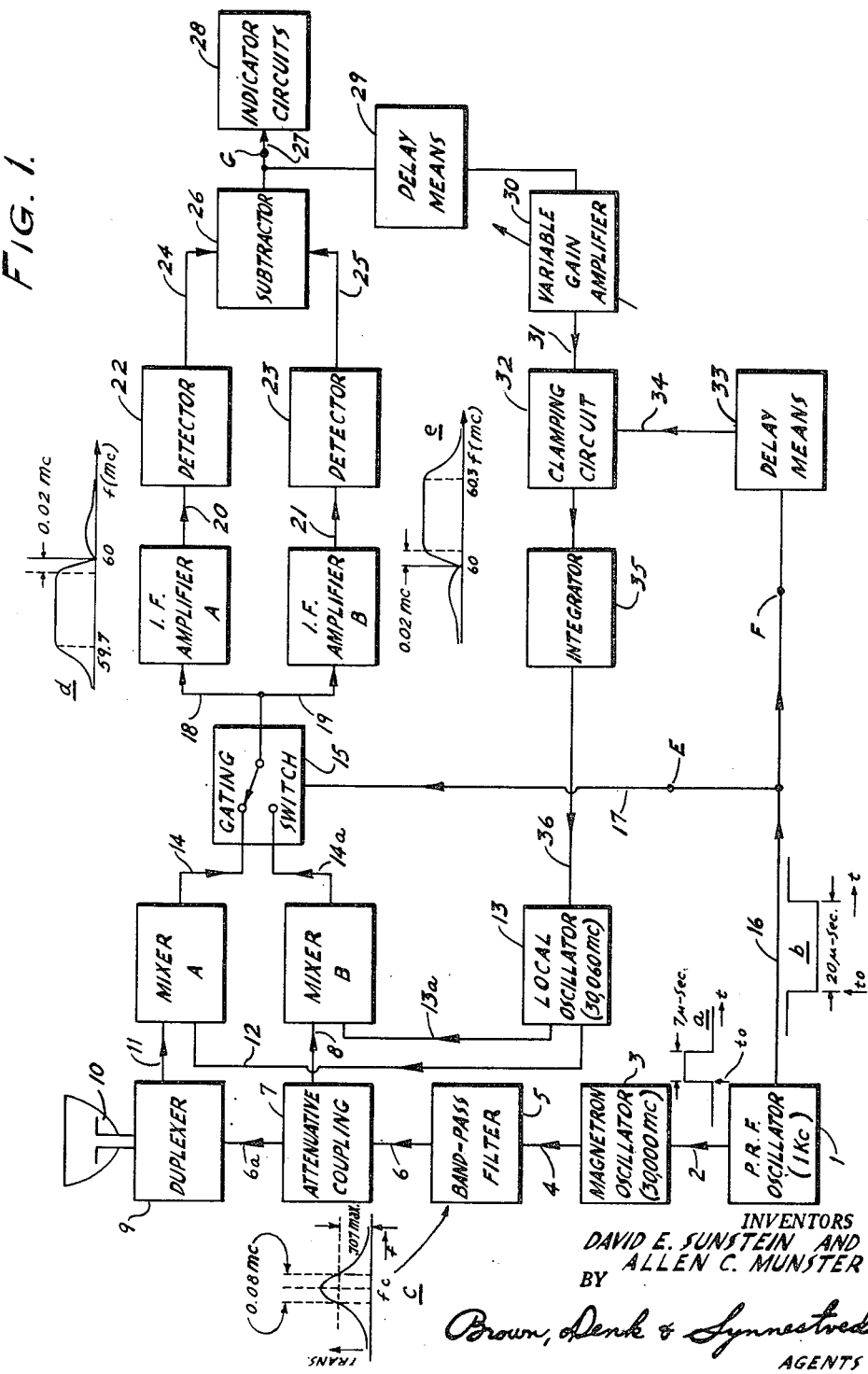

INVENTORS
DAVID E. SUNSTEIN AND
ALLEN C. MUNSTER
BY Brown, Denk & Synnestvedt
AGENTS

United States Patent Office 2,788,450
Patented Apr. 9, 1957

2,788,450

AUTOMATIC SIGNAL CONTROL SYSTEM

David E. Sunstein, Cynwyd, and Allen C. Munster, Philadelphia, Pa., assignors to Philco Corporation, Philadelphia, Pa., a corporation of Pennsylvania Application June 4, 1947, Serial No. 752,370

11 Claims. (Cl. 250—36)

The invention herein described and claimed relates to automatic control systems and, in particular, to the class of such systems in which an input signal is modified to yield an output signal which is controlledly related to said input signal, said relationship being determined in response to said output signal. Control systems of this category are applicable generally to the control of mechanical, electrical, thermal and other processes and are frequently referred to as "servo" systems. Depending upon the kind of system to which the control is applied, the input signal may be, for example, a mechanical motion, an electrical signal or a thermal quantity.

For purposes of this specification it will be convenient to describe and discuss the invention as applied to electrical systems, although it will be apparent that it is equally applicable to mechanical, thermal and other systems.

A typical electrical application of systems of this sort is in automatic frequency control (AFC) and automatic gain control (AGC) systems such as are widely used in receivers of radio and radar signals. In such receivers, automatic frequency control systems are customarily used to control the frequency of a local oscillator, the output from which is heterodyned with the received signal to yield an intermediate frequency signal whose carrier frequency must be maintained within predetermined limits corresponding to the limits of the band in which an intermediate frequency amplifier is capable of functioning efficiently. Likewise, in such receivers, automatic gain control systems are employed to effect substantially an equalization of the strength of received signals of varying intensity.

A wide variety of such systems has been developed, each possessing peculiar characteristics which adapt it for certain specific applications. Each, however, appears to incorporate means of one kind or another for performing two basic functions—namely: (1) measuring the departure from a predetermined standard of some particular characteristic of the signal to be controlled, and (2) effecting, in response to the magnitude of such measured departure, a diminution thereof. Apparently, also, those systems which have been developed in the past are characterized in that the force tending to restore the particular characteristic of the controlled signal to standard decreases in magnitude as the value of the predetermined characteristic approaches the standard value. Although this characteristic is in certain respects desirable (i. e. the tendency to overshoot is thereby reduced), it also gives rise to the disadvantage that the restoration of the controlled signal to standard occurs more slowly than is permissible for certain applications.

For example, this characteristic represents a distinct disadvantage in an automatic frequency control arrangement used in the receiver circuits of a radar system to control the frequency of the local oscillator so that the intermediate carrier frequency, resulting from heterodyning of the local oscillator signal with the received signal, will always lie within the desired intermediate frequency band. In a radar system of the usual type, in which energy is transmitted in the form of pulses of relatively short duration and relatively widely spaced in time, it is generally feasible for the AFC system to operate only during intervals coinciding in time with the transmitted pulses, and in response to energy contained in said pulses. In general, reliable control cannot be effected in response to the reflections of such transmitted pulses from target objects. This being the case, if the frequency variation of the transmitted signal is not too rapid, a circuit having a long time constant compared to the pulse repetition period may be used to maintain control during the intervals between pulses. This, however, will make the system slow acting and unsuitable for use where the transmitted frequency is susceptible of rapid variation.

Means have been devised in an attempt to correct this difficulty. For example, in radars operating at extremely high transmitted frequencies (e. g. of the order of 10,000 megacycles), it has been customary to provide means for sweeping the local oscillator frequency back and forth throughout a range. The control signal is then applied directly to control the sweeping in a manner to maintain the oscillator frequency within prescribed limits. However, even this method is not adapted to provide the precision of control which is required under certain circumstances. This might be the case, for example, in a so-called single-shot object motion indicating radar system of the sort described in copending application of David E. Sunstein, Serial No. 694,297, filed August 31, 1946, now Patent No. 2,739,307, dated March 20, 1956. In a system of the sort there described, indications of object motion are produced in response to shifts in the frequency of the energy contained in individual transmitted pulses when they are reflected from moving objects. The effectiveness of such a system could be greatly enhanced by providing means capable of precisely adjusting the local oscillator frequency following each transmitted radar pulse. There are, of course, many other instances in which such precision of control is advantageous or necessary, and this is true of signal characteristics other than frequency.

Accordingly the principal objects of the invention are:

(1) To provide improved automatic control systems and methods which are capable of yielding extremely high sensitivity of control;

(2) To provide improved means for automatically controlling the relationship between input signals to a system and output signals from said system, whereby said relationship is successively redetermined in response to the values of output signals from said system during time-spaced intervals;

(3) To provide an improved automatic control system in which the relationship between input signals to said system and output signals from said system is continuously controlled in response to the values of said output signals during time-spaced intervals of limited duration;

(4) To provide improved means for automatically controlling the relationship between input signals to a system and output signals from said system whereby said relationship is successively redetermined following recurrent time-spaced intervals in response to the values of output signals from said system during said intervals;

(5) To provide an automatic control system of the class in which an input signal is modified to yield an output signal which is controlledly related to said input signal, said relationship being determined in response to said output signal and in such manner that a new relationship between input and output signals is substantially established before any change in the output signal owing to said new relationship is permitted to effect a further alteration in said relationship;

(6) To provide an automatic control system of the class in which an input signal is modified to yield an output signal which is controlledly related to said input signal, said relationship at any given time being determined in response to the value of the output signal at some preceding time and being substantially independent of the change in said relationship between said times.

The general method of achieving these objectives according to the invention will most readily be understood by considering the application of the invention to a specific system—an automatic frequency control system employing a conventional local oscillator and mixer, whereby the relationship between the frequencies of input signals to said mixer and output signals from said mixer is controlled, by appropriately varying the frequency of the local oscillator signal supplied to the mixer, in a manner to maintain the frequency of the output signal from the mixer substantially constant. As in conventional AFC systems, a discriminator is provided to measure the deviation of the mixer output from a standard frequency and to develop a control signal proportional to such deviation, which is supplied to the local oscillator to modify the frequency of the signal supplied by it to the mixer.

According to the invention, the discriminator output is gated, or alternatively the discriminator is rendered operative intermittently, to provide control signals which are determined by the mixer output only during time-spaced intervals of relatively short duration. In a radar system, for example, these may correspond to the intervals during which pulses of high frequency energy are radiated by the transmitter. The application of these signals to the local oscillator is delayed in time by an amount of the order of, and preferably at least as great as, the durations of the intervals during which they are developed. It is to be noted that this delay may be included anywhere in the loop circuit comprising the mixer, the discriminator, the local oscillator and their interconnections, each with the other. Thus, if desired, a substantial portion of the delay may be included in the connection from the mixer to the discriminator, or it may be found that the inherent delay around the loop will suffice.

The relation between the delay in the application of the control signal and the duration of the intervals in which control signal is developed is of the essence of the invention. By appropriate determination of this relationship it is possible to prevent a change in the local oscillator frequency in response to a change in the output frequency from the mixer until after the interval during which the discriminator is operative to develop a control signal. This means that the ultimate shift in local oscillator frequency will, if the circuits are properly adjusted, be exactly that required to compensate for the deviation in frequency of the mixer output from standard. It will not be reduced, as in an ordinary AFC system, by the gradual reduction in magnitude of the control signal as the oscillator frequency approaches the value required for exact compensation. In other words, the objective will be achieved that the relation between output and input of the mixer, as determined by the frequency of the local oscillator at any particular time, will depend almost solely on the output of the mixer at some preceding time and will be substantially independent of the change in said relationship between said times.

Figure 2:
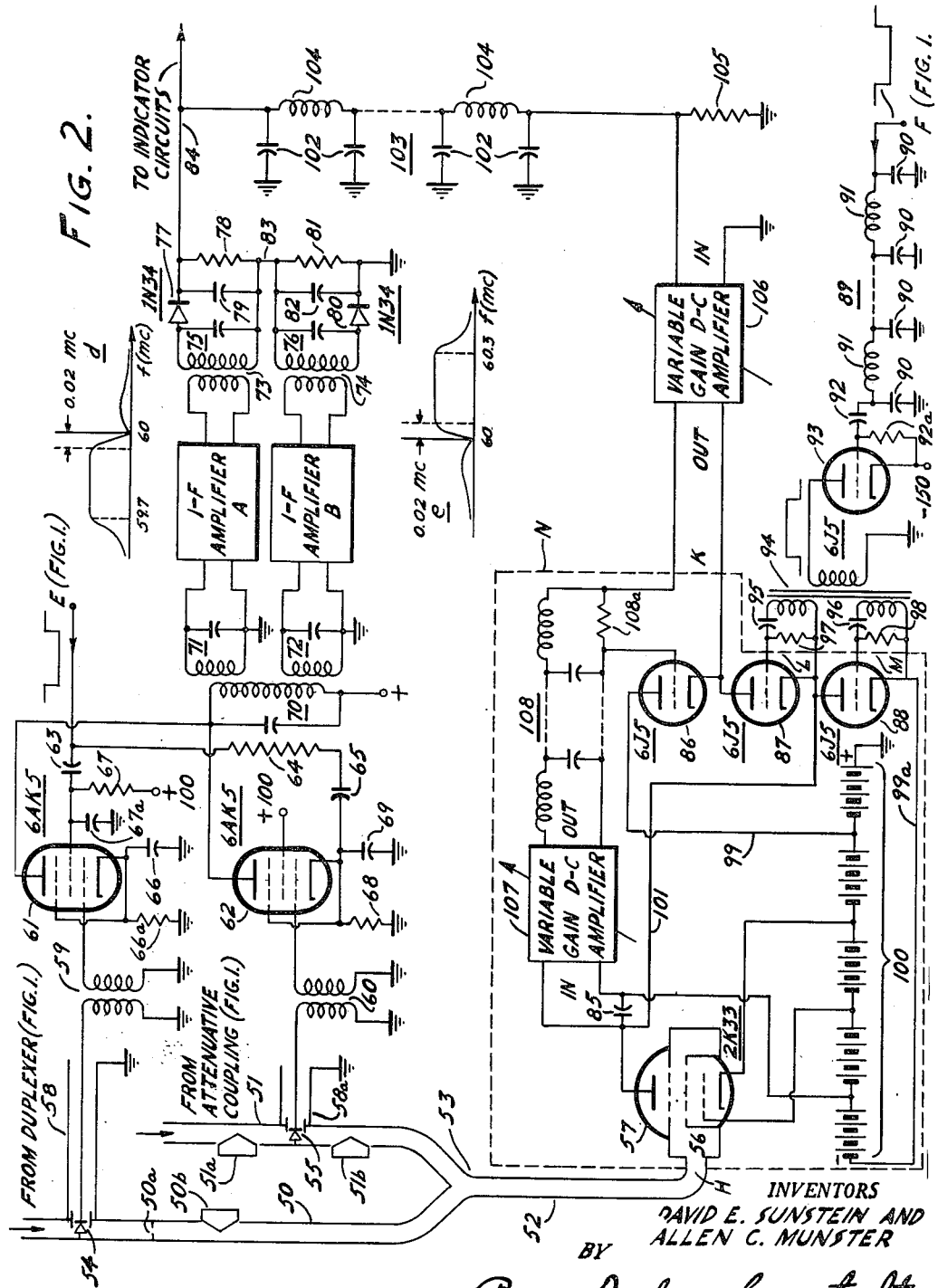
Figure 3:
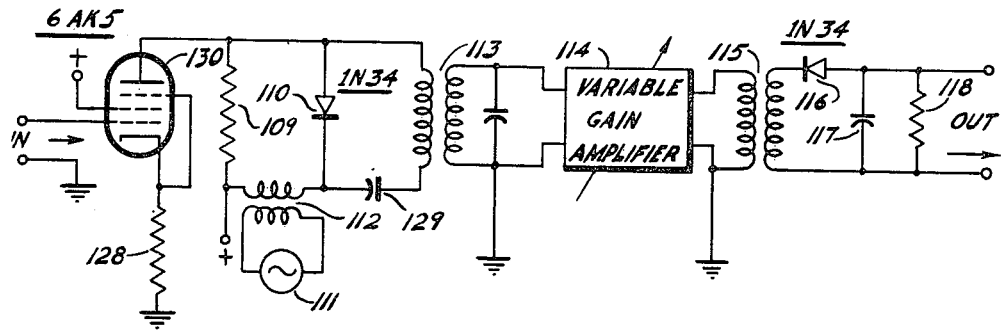
Figure 4:
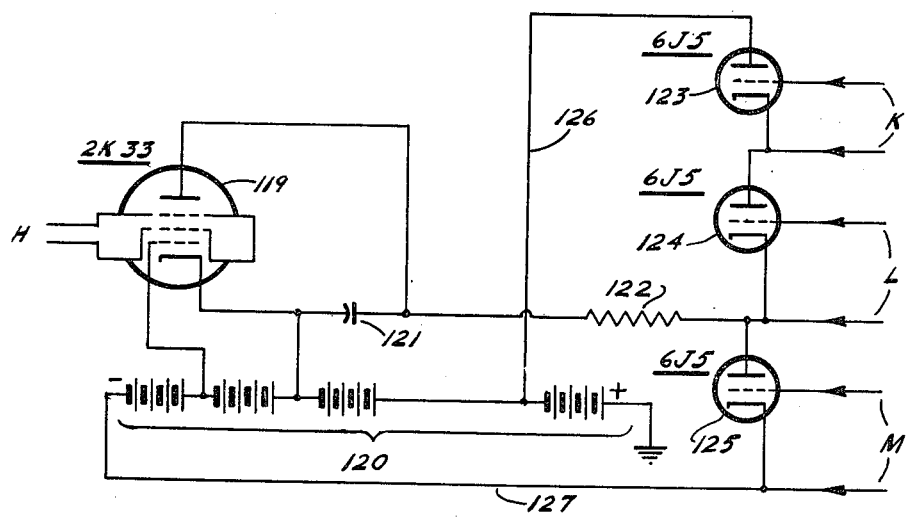

A complete understanding of the invention and of the organization and operation of a representative embodiment thereof will be gained by reading the following description with reference to the accompanying drawings in which Figure 1 is a functional diagram of a so-called single-shot object motion indicating system embodying the invention; Figure 2 is a schematic representation of circuits in accordance with the invention, which may be used in the system according to Figure 1; Figure 3 is a schematic diagram illustrating the details of a variable gain D.-C. amplifier suitable for use in the circuits of Figure 2; and Figure 4 illustrates schematically a modification of a portion of the circuits according to Figure 2.

Referring now to Figure 1, in the "single-shot" radar system there functionally represented, P. R. F. (pulse repetition frequency) oscillator 1 is adapted to generate time-spaced electrical pulse signals having durations of 7 and 20 microseconds respectively, pulses of both durations being recurrent at a repetition frequency suitable for radar purposes—e. g. one kilocycle per second. These pulses may be of substantially rectangular form as indicated at *a* and *b*, and their leading edges, as shown, may be substantially coincident in time.

The shorter pulses are supplied through connection 2 to magnetron oscillator 3 to control the generation by it of corresponding time-spaced pulses of energy which may be of a frequency in the microwave range—e. g. 30,000 megacycles per second. These pulses in turn are supplied through connection 4 to the input of a band-pass filter 5, which, for purposes of the "single-shot" operation here under consideration, may have a characteristic of transmissivity versus frequency as represented at *c*, the bandwidth between half power points being, for example, 0.08 megacycle. The output of the band-pass filter will comprise pulses of rounded waveform at the pulse repetition frequency, consisting of frequency components primarily within a relatively narrow band (e. g. 0.075 megacycle) as determined by the width of the filter pass band and the spectral distribution of the energy supplied by magnetron oscillator 3. Each of these pulses will be approximately 10 microseconds in duration between half-power points.

These pulses are supplied through connections 6 and 6a to duplexer 9—an automatic high frequency switching device which may be constructed in accordance with usual radar practice. It is adapted, during the occurrence of each pulse of high frequency energy supplied from the output of band-pass filter 5, to transmit such pulses to the common transmitting and receiving antenna 10 to be radiated. At the same time it is adapted to prevent high-level, high-frequency energy in any appreciable amount from entering the circuits of mixer A. The latter is adapted to be supplied through connection 11 with reflections of transmitted energy from target objects intercepted by antenna 10. Accordingly, duplexer 9 is also adapted, during the major portions of intervals between transmitted pulses, to permit the transmission of energy intercepted by antenna 10 through connection 11 to mixer A. To these ends it may be constructed in accordance with conventional practice as fully set forth in numerous texts and technical articles, and may employ one or more T-R tubes, such as are well known in the art. (A T-R tube comprises essentially a pair of electrodes separated by a discharge gap and enclosed in a glass envelope containing air and water vapor at a pressure of the order of one millimeter of mercury.)

By means of an attenuative coupling 7 included in connections 6 and 6a from band-pass filter 5 to duplexer 9, a small amount of energy from each transmitted pulse is abstracted and supplied through connection 8 to the input of mixer B. Although this coupling is included in the connection 6, 6a from filter 5 to duplexer 9, it is not intended to attenuate the energy flowing in this path. In the event that connections 6, 6a and 8 are waveguides (as is customary at these frequencies), the attenuative coupling may consist merely of a relatively small hole in the waveguide comprising connections 6 and 6a at the point of junction between it and the waveguide comprising connection 8. Mixer B may be of the usual type, employing, for example, a silicon crystal. To its input there is also supplied, through connection 13a from local oscillator 13, a signal whose nominal frequency (subject to variation as will hereinafter be set forth) may be 30,060 megacycles so that, by mixture of the local oscillator signal with the nominal 30,000 megacycle transmitted frequency, an intermediate frequency of 60 megacycles will be produced in mixer B. It will be understood, of course, that the transmitter frequency will tend to vary from its nominal value owing to inherent instability of the magnetron oscillator and variations in the load impedance presented to it by antenna 10. It is for this variation in frequency that the circuits now to be discussed, including mixer B and local oscillator 13, are intended to correct.

The output from mixer B is supplied through connections 14a to a gating switch, which in turn is adapted alternately to connect the output circuits of either mixer A or mixer B through connections 18 and 19 to the inputs of two intermediate frequency amplifiers, A and B. Gating switch 15 is controlled in response to the 20-microsecond pulses supplied from P. R. F. oscillator 1 through connections 16 and 17. In response to the occurrence of such pulses it is adapted to connect the output of mixer B to the inputs of I.-F. amplifiers A and B; while in the intervals between such pulses it is adapted to connect the output of mixer A to the inputs of the same two I.-F. amplifiers. The fact that the durations of the controlling pulses supplied to gating switch 15 from P. R. F. oscillator 1 are somewhat greater than the durations of transmitted pulses, serves to insure that mixer B will be connected to I.-F. amplifiers A and B throughout all of each transmitted pulse, so that the maximum frequency controlling action can be exerted by the circuits presently to be described.

The separate outputs of I.-F. amplifiers A and B are supplied through connections 20 and 21 respectively to separate detectors 22 and 23. The separate outputs of these detectors in turn are supplied through connections 24 and 25 respectively to subtractor 26 which is adapted to yield, at its output in connection 27, the difference between the detected outputs of I.-F. amplifiers A and B. I.-F. amplifiers A and B are designed to have complementary gain versus frequency characteristics as represented at d and e respectively. As will be noted from these representations, the gain of each amplifier falls to zero at the nominal I.-F. frequency of 60 megacycles. The response of amplifier A rises to a peak at a frequency slightly below 60 megacycles and remains at this level throughout a range of approximately 0.3 megacycle immediately below the nominal I.-F. frequency. The response of amplifier B, on the other hand, rises to a peak at a frequency just above the nominal I.-F. frequency and remains at this level throughout a similar range in the neighborhood above the nominal 60 megacycle intermediate frequency.

Thus, whenever the intermediate frequency supplied by mixer B deviates below the nominal intermediate frequency, owing for example to a decrease in the frequency of the output from magnetron oscillator 3, the output from I.-F. amplifier A will exceed that from amplifier B and a resultant signal will appear at the output of subtractor 26. On the other hand, when the intermediate frequency supplied from the output of mixer B deviates above the nominal intermediate frequency, owing to an increase in the frequency of the output from magnetron oscillator 3, the output from I.-F. amplifier B will exceed that from amplifier A and a resultant of opposite polarity will appear at the output of subtractor 26.

Output from subtractor 26 is supplied through delay means 29 and variable gain amplifier 30 to a so-called clamping circuit 32. In response to the modified subtractor output, and in response to delayed 20-microsecond pulses supplied through connection 16, delay means 33 and connection 34, clamping circuit 32 cooperates with integrator 35, during the intervals defined by the delayed 20-microsecond pulses, to develop a control signal whose magnitude is a function of the magnitude and polarity of the resultant output signal from subtractor 26. The magnitude of this control signal, as determined during the occurrence of each 20-microsecond pulse, is maintained substantially constant, through the cooperation of integrator 35 and clamping circuit 32, during the intervals between successive 20 microsecond pulses, and is redetermined upon the occurrence of each successive pulse.

The control signal thus developed is supplied through connection 36 to local oscillator 13 to control the frequency of signal supplied by it through connection 13a to the input of mixer B. By appropriate adjustment of the gain of amplifier 30, as will be explained hereinafter, this control may be made to compensate for variations in the output frequency of magnetron oscillator 3 supplied through band-pass filter 5, attenuative coupling 7 and connection 8 to the input of mixer B, so as to restore the intermediate frequency output therefrom to the nominal 60-megacycle value and so as to maintain the output of local oscillator 13 at a substantially constant frequency during the intervals between successive transmitted pulses.

In accordance with the principles of the invention as hereinbefore discussed, the cumulative delay around the AFC loop circuit, comprising mixer B, gating switch 15, I.-F. amplifiers A and B, detectors 22 and 23, subtractor 26, delay means 29, variable gain amplifier 30, clamping circuit 32, integrator 35 and local oscillator 13, should be of the order of and preferably greater than the duration of a transmitted pulse. In some instances this delay will inhere in the various elements comprising the loop circuit. However, if the delay is insufficient, additional delay may be introduced at any point in the loop—for example, in the manner shown, by the inclusion of delay means 29. Obviously the inclusion of such additional delay makes necessary the inclusion of delay means 33, or its equivalent, in the connection from P. R. F. oscillator 1 to clamping circuit 32, to delay the 20-microsecond pulses supplied therethrough to clamping circuit 32.

By the inclusion of the specified amount of delay in the AFC loop circuit, any deviation in the frequency of the output from mixer B from the nominal intermediate frequency is prevented from causing a shift in the output frequency from local oscillator 13 until after the disconnection of the output of mixer B from the inputs to I.-F. amplifiers A and B by gating switch 15. Thus the shift in frequency of the output from local oscillator 13 will be determined by the actual deviation in the output frequency from mixer B from the nominal value during the occurrence of a transmitted pulse, and any reduction in this shift which would be produced as a result of changing the output frequency of local oscillator 13 during the transmitted pulse interval will be eliminated. In this manner there is provided an automatic frequency control system capable of exactly correcting the local oscillator frequency upon the occurrence of each transmitted pulse, and of maintaining this correction until after the occurrence of the next succeeding transmitted pulse.

The output from local oscillator 13 is also supplied through connection 12 to the input of a separate mixer A. This mixer is also supplied with received signals intercepted by antenna 10, and the resultant heterodyne signals appearing in its output will be maintained in the center of the nominal intermediate frequency band, except, of course, when the frequency of received signals differs from the transmitted frequency, owing, for example, to reflection from moving target objects.

The heterodyned received signals from the output of mixer A are supplied through connection 14, gating switch 15 and connections 18 and 19 to the inputs of the same I.-F. amplifiers A and B. It will be recalled that during the intervals between successive transmitted pulses, gating switch 15 is adapted to effect this connection in response to pulses supplied to it from P. R. F. oscillator 1 through connections 16 and 17. So long as the frequency of the heterodyned received signals from the output of mixer A corresponds to the nominal 60-megacycle I.-F. center frequency, no resultant output will be produced by subtractor 26 during the intervals between successive transmitted pulses. However, if the signals intercepted by antenna 10 are caused to differ in either sense from the transmitted frequency owing to reflection from moving target objects, the heterodyne output from mixer A will deviate correspondingly from the nominal I.-F. center frequency and I.-F. amplifiers A and B will operate on these signals in the same manner as in the case of deviations in the frequency of the output from mixer B during the intervals corresponding to transmitter pulses.

Thus the output from subtractor 26, during intervals between transmitted pulses and in the presence of reflections from moving target objects, will be indicative of the presence of such moving objects, and the direction of their motion will be indicated by the polarity of the output from the subtractor. These signals are supplied through connection 27 to any suitable indicator circuits 28 adapted to present this information in a manner which may be in accord with standard practice for systems of this sort. It is to be noted that, owing to the fact that clamping circuit 32 is rendered responsive only during the occurrence of transmitted pulses to resultant signals appearing in the output of subtractor 26, the control signal developed thereby and applied to local oscillator 13 will not be altered during the intervals between successive transmitted pulses by resultant signals present in the output of subtractor 26 owing to signals received from moving objects. Rather the local oscillator frequency will tend to remain constant during each interval between transmitted pulses and during the transmitted pulse which immediately follows, and will be altered to conform to the new transmitted frequency immediately following transmission.

Brief mention may be made of the reasons for employing separate mixers A and B to achieve mixing of the local oscillator signal with the transmitted and received signals respectively. Although it might be possible to use only a single mixer (mixer A) and to rely on the inherent leakage through duplexer 9 to supply signal from magnetron oscillator 3 to the input of mixer A, this arrangement appears to be less desirable than the one described. This is owing to the fact that, during the intervals of transmission by the system, duplexer 9 will be a source of spurious signals generated in the cavities of the T-R tubes. These spurious signals would tend to affect adversely the operation of the AFC circuits.

In the arrangement shown in Figure 2 there is provided a waveguide structure comprising the two sections 50 and 51, ends of which are joined to an end of a third section 52 by means of a conventional Y-junction 53. Section 50 may be supplied at its upper end with received signals—for example from duplexer 9 of the system according to Figure 1; while section 51 may be supplied at its upper end with a portion of the transmitter energy—for example from the attenuative coupling 7 of the arrangement according to Figure 1. The lower end of section 52, as illustrated, may be connected to the cavity resonator 56 of a velocity-modulation type local oscillator tube 57. Disposed within waveguide sections 50 and 51 at points interjacent their extremities are silicon crystals 54 and 55 respectively. Crystal 54 is adapted to mix the incoming signal supplied to the upper end of waveguide section 50 with local oscillator signal supplied via section 52, Y-junction 53 and the lower portion of waveguide section 50. To prevent any appreciable amount of input power from the duplexer from proceeding beyond the point at which crystal 54 is located and being dissipated in the local oscillator cavity, an iris 50a is inserted in waveguide 50 at a point approximately one-quarter wavelength from crystal 54 in the direction of the oscillator cavity. Also, to regulate the amount of local oscillator power supplied to crystal 54, there is provided a controllable attenuator comprising a strip 50b of lossy material (e. g. Bakelite) which enters waveguide section 50 through a slot in its wall interjacent crystal 54 and the local oscillator cavity 56. The resultant heterodyne signal produced by crystal mixer 54 is supplied through a transmission line section 58 to the primary winding of transformer 59.

Likewise, crystal 55 is adapted to mix the portion of the transmitter energy supplied to the upper end of waveguide section 51 with local oscillator signal supplied through waveguide section 52, Y-junction 53 and the lower part of waveguide section 51. To regulate the amounts of transmitter and local oscillator energy supplied to crystal 55, controllable attenuators are provided in waveguide section 51 on both sides of crystal 55. These take the form of strips 51a and 51b of lossy material inserted into the waveguide through slots in its wall. The heterodyne signal produced in crystal mixer 55 is supplied through a transmission line section 58a to the primary winding of transformer 60.

The signals appearing in the secondary windings of transformers 59 and 60 are supplied respectively to the control grids of pentode vacuum tubes 61 and 62. These tubes together constitute a gating switch, corresponding to switch 15 of Figure 1, for controlling the alternate transmission of the two heterodyne signals produced in crystal mixers 54 and 55 to the tuned primary winding 70 of a transformer having separate tuned secondary windings 71 and 72. To control such alternate transmission, tube 61 is normally biased to conduct, while tube 62 is normally biased to a condition of cut-off. Negative pulses, coinciding in time with the intervals of transmission of the radar system, are supplied through coupling condenser 63 to the screen grid of tube 61 and through isolating resistor 64 and coupling condenser 65 to the cathode of tube 62. During the occurrence of such negative pulses, tube 61 will be caused to cut off and tube 62 will be rendered conductive so as to transmit heterodyne signals from crystal mixer 55 to the transformer primary winding 70.

Regardless of the condition of tubes 61 and 62, the signals appearing in the primary winding 70 will be transferred to both of the tuned secondary windings 71 and 72 which are connected respectively to the inputs of I.-F. amplifier A and I.-F. amplifier B. The gain versus frequency characteristics of these amplifiers are as illustrated at $d$ and $e$ respectively and correspond to those already discussed with reference to the embodiment of the invention shown in Figure 1. The method of designing amplifiers capable of providing such characteristics is well understood, and hence it is not considered necessary to illustrate the amplifier circuits in detail. The outputs of the two intermediate frequency amplifiers are connected respectively to the primary windings of transformers 73 and 74. To the secondary windings 75 and 76 of these transformers are connected conventional detector circuits which are here shown as comprising germanium crystals 77 and 80, condensers 79 and 82 and load resistors 78 and 81. A connection is provided between the lower terminal of resistor 78 and the upper terminal of resistor 81, and crystals 77 and 80 are connected in their respective circuits in opposite senses so that resultant signal, developed across resistors 78 and 81 in series, will be equal to the difference between the separate detected signals appearing across resistors 78 and 81 individually. These resultant signals may be supplied through connection 84 to suitable indicator circuits as in the arrangement according to Figure 1. Also, as in the arrangement of Figure 1, the signals developed across resistors 78 and 81 in series, during the intervals in which gating tube 62 is conducting, may be delayed and used to control the frequency of signal generated by the local oscillator tube 57.

The local oscillator frequency is conveniently controlled by varying the potential of the repeller electrode of tube 57. To this end there is provided a condenser 85 in series with the connection from the repeller electrode to a tap on the D.-C. power supply 100. During the intervals corresponding to transmission of pulses of high frequency energy by the radar system, the charge on condenser 85 is increased or decreased by an amount which may be made substantially proportional to the resultant signal developed across resistors 78 and 81 in series. This is accomplished through the agency of triode vacuum tubes 86, 87 and 88 which are connected in series, the cathode of tube 86 being connected to the plate of tube 87 and the cathode of tube 87 being connected to the plate of tube 88. D.-C. power for the operation of these tubes is supplied through connections 99 and 99a from the plate of tube 86 and the cathode of tube 88 respectively to taps on D.-C. power supply 100. The latter also serves as power supply for local oscillator tube 57. As illustrated, one plate of condenser 85 is connected through connection 101 to the junction between the cathode of tube 87 and the plate of tube 88.

Tubes 87 and 88 are rendered conductive during intervals delayed with reference to those of transmission by the radar. To this end, the 20-microsecond pulses from P. R. F. oscillator 1 of Figure 1 are delayed in a delay line 89 comprising condensers 90 and inductors 91. The output of the delay line is supplied through condenser 92 to the grid of a driver tube 93, in the output circuit of which is connected the primary winding of a transformer 94. From the secondary windings of transformer 94 positive 20-microsecond pulses are supplied to the grids of tubes 87 and 88. During the occurrence of these positive pulses, tubes 87 and 88 are rendered conductive; while during the intervals between such pulses, tubes 87 and 88 are cut off owing to the charge accumulated on grid condensers 95 and 96 during the intervals of conduction.

While tubes 87 and 88 are conducting, the current through them is determined in accordance with the potential applied to the grid of tube 86. In order that this current may be substantially proportional to the resultant signal appearing across resistors 78 and 81, the latter signal is supplied through delay line 103 and variable gain D.-C. amplifier 106 to the input of tube 86. Delay line 103 comprises condensers 102 and inductors 104 and is terminated in an impedance 105 of appropriate value. The delay introduced by it should be such that the over-all delay around the AFC loop is at least as great as the durations of the intervals during which tubes 87 and 88 are conductive. However, if there is no resultant signal across resistors 78 and 81 (as will be the case when local oscillator 57 is operating at a frequency such as to compensate exactly for any deviation in the transmitter frequency), it is desired that condenser 85 be neither charged nor discharged during the conductive intervals of tubes 86 and 87. Accordingly the potential developed across condenser 85 is supplied through a variable gain D.-C. amplifier 107 and through a delay line 108 in series with the input to tube 86. Thus the current in tubes 87 and 88, during their conductive intervals, is controlled in response to the potential across condenser 85. By appropriate adjustment of variable gain D.-C. amplifier 107, it may be controlled in such a manner that no charging or discharging of condenser 85 will take place except when additional input to tube 86 is supplied from the output of variable gain D.-C. amplifier 106. By the inclusion of delay line 108, changes in the potential across condenser 85 in response to this input are prevented from being neutralized. To this end the delay in application of the potential from condenser 85 to the input of tube 86 should be at least as great as the duration of the intervals during which tubes 87 and 88 are conductive.

The variable gain D.-C. amplifiers 106 and 107 may be constructed as shown in Figure 3. Here the input signal to be amplified, and whose D.-C. component is to be preserved, is applied to the control grid of a pentode vacuum tube 130, and the output signal appearing across load resistor 109 is modulated upon a carrier of suitably high frequency (e. g. 20 megacycles) supplied from a source 111 through a transformer 112. Modulation is effected by means of a germanium crystal 110, and the resultant signal is supplied through a transformer 113 to the input of a conventional variable gain amplifier 114. The output from this amplifier appearing across the secondary winding of transformer 115 is detected by means of a circuit comprising a second germanium crystal 116, a condenser 117 and a load resistor 118. The amplified output appearing across resistor 118 includes the D.-C. component contained in the input signal.

By reasonably careful adjustment of the gain of amplifiers 106 and 107 in the arrangement according to Figure 2, it is possible to cause the AFC system to correct almost instantaneously and exactly for departures in the frequency of signals supplied to the input end of waveguide 54. This adjustment is readily made by varying the gains of amplifiers 106 and 107 until the mean frequencies of heterodyned received signals from fixed targets supplied to the inputs of I.-F. amplifiers A and B correspond at all times with the null points of their respective characteristics as represented at $d$ and $e$. Even if the adjustment is not exactly made for this optimum control, correction will, in general, be effected more rapidly and more precisely than in known systems, provided only that, in any given instance, the increment or decrement of charge on condenser 85 does not exceed twice the amount required exactly to correct the frequency of local oscillator 57.

It may be mentioned that, when the adjustments referred to in the previous paragraph are made upon amplifiers of the form illustrated in Figure 3, it may be necessary to readjust the potentials supplied to the elements of tube 57—particularly the cathode potential. The need for such adjustment could be obviated by using a balanced version of the amplifier shown in Figure 3.

If desired some simplification can be made in the circuits of the arrangement according to Figure 2, while still retaining in large part the advantages of the more complicated circuit. For example, for the portion of the circuit of Figure 2 enclosed within broken line N, there may be substituted the simpler arrangement shown in Figure 4. In making this substitution the terminals H, K, L and M in Figure 4 may be connected at the similarly designated points in Figure 2. In Figure 4, triodes 123, 124 and 125 correspond respectively to triodes 86, 87 and 88 of the arrangement according to Figure 2 and perform substantially the same functions. Likewise, local oscillator tube 119 of Figure 4 corresponds to local oscillator tube 57 of Figure 2 and is similarly connected. However, in the arrangement according to Figure 4, variable gain D.-C. amplifier 107 and delay line 108 of Figure 2 are omitted. Thus no means is provided for controlling the current in tubes 124 and 125 during their conductive intervals in accordance with the potential developed across condenser 121. Hence, regardless of the frequency at which local oscillator 119 is operating, as determined by the charge on condenser 121, if the resultant output from resistors 78 and 81 of the arrangement according to Figure 2 is zero and no signal is applied to the grid of tube 123, the current through tubes 124 and 125 will be the same and condenser 121 may be either charged or discharged. To minimize this effect, resistor 122 is included in the connection from condenser 121 to the junction between the cathode of tube 124 and the plate of tube 125. The time constant of the RC circuit comprising resistor 122 and condenser 121 is made large compared to (e. g. 100 times) the duration of the intervals during which tubes 124 and 125 are conductive. By this means the effect on the charge on condenser 121 during intervals in which no signal is applied to the grid of tube 123 is minimized. At the same time variations in the current through tubes 124 and 125 will be effective to alter the charge on condenser 121 so as to control the frequency of local oscillator 119.

It is to be noted that, in the system as described with reference to Figures 1 and 2, I.-F. amplifiers A and B and their associated circuits serve both to detect departures in frequency of received signals indicative of moving objects, and also, during the transmitted pulse intervals, as an AFC discriminator. By utilizing the same circuits in this manner to perform both functions, there is avoided the necessity for providing two circuits which would have to be carefully tuned to the same frequency. This feature is a direct result of the mode of operation in accordance with the invention, whereby the AFC circuit operates only during intervals in which received signals are not required to be detected.

As has been emphasized, the various time relationships involved in circuits according to the invention are of considerable significance. Accordingly it is appropriate to refer to the values of components to be employed in the circuits according to Figures 2, 3 and 4 with the caution, however, that these are not to be regarded as necessarily applicable except under the specific conditions hereinbefore recited, namely:

| | |
|---|---|
| Transmitter frequency | mc 30,000 |
| Pulse repetition rate | cycles 1,000 |
| Transmitted pulse length (between half-power points) | μsec 10 |
| Transmitted bandwidth (between half-power points) | mc 0.075 |
| Intermediate frequency | mc 60 |

For these conditions, the component values may be as follows:

| | |
|---|---|
| Resistors 66a and 128 | ohms 220 |
| Condensers 66 and 69 | μμfd 1,200 |
| Resistor 64 | ohms 2,000 |
| Condensers 65 and 67a | μμfd 200 |
| Resistors 67, 78, 81, 109 and 118 | ohms 10,000 |
| Condensers 79, 82, 117 and 129 | μμfd 20 |
| Condensers 63, 92, 95 and 96 | μfd 0.1 |
| Resistors 92a, 105 and 108a | ohms 1,000 |
| Condensers 85 and 121 | μfd 0.001 |
| Resistors 68, 97, 98 and 122 | megohms 1 |
| Characteristic impedance of delay lines 89, 103 and 108 | ohms 1,000 |

Tubes and crystals as designated in Figure 2.

It is, of course, to be understood that, although the invention has been described with reference to but a single representative embodiment, which adequately illustrates the principles involved and the method of applying them, these principles are susceptible of application in numerous other instances, and employing other arrangements which, nevertheless, lie within the scope of the invention as defined by the appended claims.

We claim:

1. In an automatic control system, a source of original signals controllable in respect of a predetermined parameter thereof, discriminatory means responsive to said original signals for producing control signals having a magnitude and polarity indicative of the magnitude and sense of departures of said predetermined parameter of said original signal from a predetermined value of said parameter, control means responsive to said control signals for controlling said source to vary said predetermined parameter of said original signals in a sense to reduce said departures and hence to reduce said control signals, said control means being normally inoperative, means independent of variations in said predetermined parameter for rendering said control means intermittently operative to control said original signals during time-spaced intervals of durations not exceeding a predetermined maximum, and means for delaying the substantial effect of said control upon said control signal for a time at least equal to said predetermined maximum duration.

2. The system of claim 1, in which said control means includes a circuit arrangement for maintaining said predetermined parameter of said original signals at a substantially constant value in the periods between said time-spaced intervals.

3. The system of claim 1, in which said means for rendering said control means operative comprises a source of periodically-recurrent signals and means for supplying said last-named signals to said control means to render said control means operative during time-spaced intervals which are periodically recurrent.

4. The system of claim 1, in which said source of original signals comprises means responsive to an input signal for producing an output signal differing from said input signals in respect of said predetermined parameter, but possessing variations in respect of said parameter which are controllably related to those of said input signals.

5. In an automatic frequency control system, a source of original signals of controllable frequency, a frequency discriminator responsive to said original signals for producing control signals having a magnitude and polarity indicative of the magnitude and sense of differences between said frequency of said original signals and a predetermined reference frequency, frequency control means responsive to said control signals to vary said frequency of said original signals in a direction to reduce said difference from said reference frequency and hence to reduce said control signals, said last-named means being normally inoperative, means for rendering said last-named means intermittently operative during time-spaced intervals not exceeding a predetermined maximum, and means for delaying the substantial effects of said variation of said frequency of said original signals upon said control signals for a time at least equal to said predetermined maximum duration.

6. The system of claim 5, in which said source of original signals comprises means responsive to a first input signal and to a second locally-generated signal for producing an output signal whose frequency differs from that of said first signal by an amount determined by the frequency of said second signal, and in which said frequency control means is operative to control the frequency of said second locally-generated signal.

7. The system of claim 5, comprising in addition means for maintaining said control signal at a substantially constant value between said time-spaced intervals of predetermined duration.

8. The system of claim 5, in which said means for rendering said control means operative comprises a source of periodically-recurrent signals for rendering said control means intermittently operative during periodically-recurrent time-spaced intervals.

9. In an automatic frequency-control system, a source of original signals of controllable frequency, a frequency discriminator responsive to said original signals to produce output signals having a magnitude and polarity indicative of the magnitude and sense of departures of said frequency of said original signals from a predetermined reference frequency, control means responsive to input signals applied thereto for supplying control signals to said source of original signals to vary the frequency of said original signals in such sense as to reduce said frequency departures, controllably-actuatable electronic switching means for intermittently supplying said discriminator output signals to said control means during time-spaced intervals substantially contemporaneous with the occurrences of actuating signals applied thereto, means for generating actuating signals comprising a series of separate time-spaced pulses of durations not exceeding a predetermined maximum, means for supplying said actuating signals to said switching means to effect application of said discriminator output signals to said control means during the occurrences of said separate pulses, and means for delaying the substantial effects of modifications of said control signals upon said discriminator output signals for a time at least equal to said predetermined maximum duration.

10. In an automatic frequency control system, a mixer responsive to an input signal and a locally generated signal to produce an output signal whose frequency is related to the frequencies of said input and locally generated signals, a local oscillator arranged to supply said locally generated signal to said mixer, a discriminator arranged to be supplied with an output signal from said mixer and operative to develop a control signal indicative of variations in the frequency of said output signal, means for supplying said control signal from said discriminator to said local oscillator to control the frequency of oscillation of said local oscillator, said last-named means being normally inoperative, means for rendering said last-named means operative intermittently to supply said control signal from said discriminator to said local oscillator during time-spaced intervals of durations not exceeding a predetermined maximum, and means for delaying the supply of said control signal from said discriminator to said local oscillator by an amount such as to prevent any substantial change in frequency of the output signal from said mixer in response to the control of said local oscillator during said intervals when said control signal supply means is operative.

11. In an automatic control system, a pair of vacuum tubes having their discharge paths connected in series, an energy storage device connected effectively in shunt with one of said tubes, whereby the quantity of energy stored therein is determined in accordance with current through said tubes when they conduct, means for rendering said tubes conductive or non-conductive simultaneously, means for establishing a controllable current in said tubes when they are conductive, means responsive to a control signal for controlling said current, and means including a signal delay device responsive to the quantity of energy stored in said energy storage device for further controlling said current.

References Cited in the file of this patent

UNITED STATES PATENTS

| | | |
|---|---|---|
| 2,333,688 | Shepard | Nov. 9, 1943 |
| 2,400,309 | Kock | May 14, 1946 |
| 2,422,082 | Crosby | June 10, 1947 |
| 2,425,013 | Stotz | Aug. 5, 1947 |
| 2,428,799 | Hayes | Oct. 14, 1947 |
| 2,433,350 | Earp | Dec. 30, 1947 |
| 2,434,293 | Stearns | Jan. 13, 1948 |
| 2,434,294 | Ginzton | Jan. 13, 1948 |